United States Patent [19]

Williams, Jr.

[11] Patent Number: 5,340,143

[45] Date of Patent: Aug. 23, 1994

[54] SLIDABLE SUPPORT FOR HEAVILY LOADED TRAILER JACK POST

[76] Inventor: Thomas M. Williams, Jr., 2310 Old Oxford Hwy., Durham, N.C. 27704

[21] Appl. No.: 191,409

[22] Filed: Feb. 3, 1994

[51] Int. Cl.$^5$ .............................................. B60S 9/00
[52] U.S. Cl. .................................. 280/475; 280/763.1; 280/477; 254/420; 254/DIG. 1
[58] Field of Search .................. 280/475, 763.1, 765.1, 280/427, 431, 477, 478.1, 479.2, 467; 254/420, 419, DIG. 1

[56] References Cited

U.S. PATENT DOCUMENTS

| | | | |
|---|---|---|---|
| 4,473,239 | 9/1984 | Smart | 280/763.1 |
| 5,009,444 | 4/1991 | Williams, Jr. | 280/477 |
| 5,184,839 | 2/1993 | Guedry | 280/475 |
| 5,195,769 | 3/1993 | Williams, Jr. | 280/478.1 |

FOREIGN PATENT DOCUMENTS 2204543 11/1988 United Kingdom ................ 280/475

Primary Examiner—Karin L. Tyson
Assistant Examiner—Florian Zeender
Attorney, Agent, or Firm—Olive & Olive

[57] ABSTRACT

The present invention provides a slidable support assembly which is affixed to an extensible jack leg of a typically heavily loaded commercial trailer and is used to support the front end of the trailer when not connected to a towing truck. The support assembly is able to slide laterally for the purpose of properly aligning the trailer hitching and towing vehicle mechanisms without injury to the operator.

10 Claims, 8 Drawing Sheets

SLIDABLE SUPPORT FOR HEAVILY LOADED TRAILER JACK POST

BACKGROUND OF THE INVENTION

1. Field of the Invention

This invention relates to a slidable support for a heavily loaded trailer jack post used to support the front end of a commercial, heavy duty trailer when not connected to a towing vehicle.

2. Description of the Related Art

Virtually all trailers, other than very light duty trailers, have a vertically extensible leg or jack post or a pair of such legs or posts and which are adapted to raise the front end of the trailer to an appropriate level to be engaged by a hitching device on a towing vehicle or to support the trailer when parked. In the case of a commercial freight trailer, the so-called fifth wheel on the towing vehicle, referred to as the tractor, includes a sliding engagement plate with an enlarged entrance slot for easy engagement by a pin attached to the trailer. This enlarged entrance slot compensates for a certain amount of misalignment between the tractor and the trailer and thus assists in slightly shifting the trailer relative to the tractor when the trailer is being connected to the tractor.

In another type of commercial application a trailer is attached to and towed by a full truck as different from a tractor. Light duty trailers of this type include those used for transporting boats, small garden tractors and the like. A typical example of a truck pulling a heavily loaded trailer is that of a utility company service truck towing a trailer on which utility poles, e.g. telephone or power poles, are transported. This type heavy duty trailer arrangement typically involves use of a hitching loop on the trailer and a mating hitching hook on the truck, which arrangement does not compensate at all for misalignment between the two vehicles. Essentially, the truck must be in perfect alignment in order to hitch the trailer to the truck.

Obviously, perfect alignment is not easily accomplished by backing a truck to a heavily loaded trailer. To correct for the common misalignment which occurs, the truck operator may attempt to move the heavily loaded trailer sideways manually. While this may be possible when the trailer has a dolly wheel on the bottom of a jack post which is supported on a hard and level surface, in other circumstances this movement cannot be done. The weight of a load of utility poles is great and even to the extent it may be balanced across the trailer's wheels still presents a formidable weight to move. A 20,000 pound gross load and a 5000 pound tongue load are normal loads for this type trailer. In a conventional widely employed type of heavy duty trailer, the jack post mounts a base or boot plate which remains secured to the lower end of the jack post during travel but contributes to the difficulty of lateral shifting of the front of the trailer during hitching. It is thus not uncommon for a truck operator to sustain a back injury while attempting to shift the front end of a heavily loaded trailer.

Practical slidable jack stands have been achieved which permit the lateral movement of a front portion of a relatively lightly loaded trailer such as a boat trailer. Such slidable jack stands suitable for relatively lightly loaded trailers are described in applicant's prior U.S. Pat. Nos. 5,009,444 and 5,195,769, the teachings of which are incorporated herein by reference. However, experience has revealed a need for an improved slidable jack stand for heavily loaded trailers and for a slidable jack stand which can be permanently attached to the trailer. The sliding jack support in the '769 patent, for example, requires the shifting force to be applied directly to the jack post being supported and has no means for enabling the lower end of the shifting lever to engage any of several positions all of which may be disadvantageous when shifting heavy loads. In addition, the sliding jack support of the '769 patent has to be repositioned in alignment with the jack leg each time the support is used.

It is therefore a primary object of this invention to improve on the slidable support of the '769 patent and to provide a slidable support for a heavily loaded trailer jack post so as to permit the lateral movement of the front portion of a relatively heavily loaded trailer in order to align the hitching mechanism to a towing truck without injury to the operator.

Other objects and advantages will be more fully apparent from the following disclosure and appended claims.

SUMMARY OF THE INVENTION

The present invention provides a slidable support apparatus particularly for a heavily loaded trailer jack post. Such support apparatus comprises a support assembly which in the preferred embodiment is permanently affixed to the foot of an extensible jack post of a commercial trailer and which assembly is able to slide in a direction generally perpendicular to the central longitudinal axis of the trailer so as to be able to move the front end of a heavily loaded trailer laterally. The support assembly has a base support member adapted to rest on a paved or unpaved ground surface and an upper support or slider member adapted to slide in a direction perpendicular to the central axis of the trailer. A low-friction bearing plate is located between the base member and slider member. Except for the low friction bearing plate, all the parts of the slidable support assembly of the invention are metal formed and are welded, bolted or otherwise secured together A fulcrum frame is permanently fixed to the slider member and has a fulcrum positioned above the slider member in a manner so as to provide optimum movement of the slider member with one stroke of the lever. Pressure on the upper end of the lever causes the slider member to move with respect to the base member enabling the front of the trailer to be positioned so that its hitch loop may be aligned with the mating hitch hook of the towing vehicle. The entire support assembly is raised and lowered with the jack post after hitching has been accomplished and travel with the trailer during transit.

Also, while presently anticipating that the sliding support assembly of the invention will find its greatest application in being permanently attached to the jack leg, it is contemplated that a lower portion of a heavily loaded jack leg could be received by a socket or other means (not shown) secured to the upper wall surface of the slider member and be shifted through the described improved fulcrum and lever structure of the invention.

DETAILED DESCRIPTION OF THE INVENTION

The slidable support assembly of the invention as fully described below while adapted to be used as a separate unit and placed where needed to assist in the process of shifting a load is expected to be in the more typical application fixedly attached to a trailer jack post or other device needing frequent lateral positional adjustment. In the preferred embodiment, a common application of the present invention is to secure one slidable support assembly to the bottom of each jack leg or post of a trailer, hereinafter referred to as a jack leg. The slidable support assembly of the invention while applicable to various types of trailers and whether heavily or lightly loaded, is believed to find its greatest value when used with a heavy duty heavily loaded commercial trailer. In the case of certain trailers, there is only one jack leg, thus only one slidable support assembly is used. With the assembly of the invention so installed, the operation of shifting the trailer a small distance traverse to its longitudinal axis so as to align the trailer hitch with the exact position of a towing vehicle hitch is made considerably easier and particularly when the trailer is heavily loaded.

Figure 1:
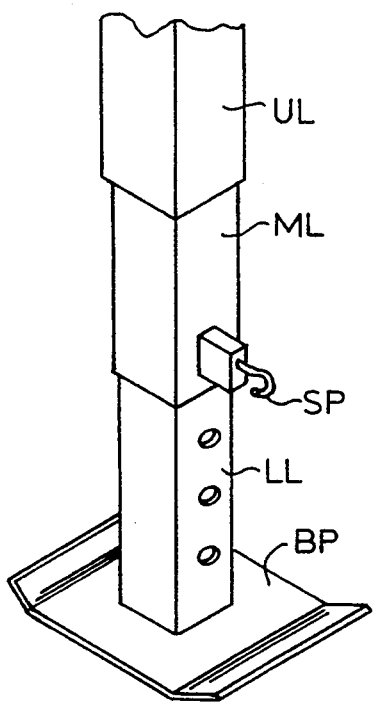
FIG. 1 is a partial perspective view of a typical heavy duty trailer jack post having a lower leg secured to a base plate and which is manually adjustable with respect to a middle leg in which the lower leg telescopes and an upper leg typically secured to the trailer and in which the middle leg telescopes and is typically secured to the trailer and in which the middle leg telescopes and is raised up and down by a crank mechanism.

In the typical heavy duty tailer jack post construction shown in FIG. 1, a lower leg LL is secured to a base plate BP and is manually adjustable by means of screw pin SP with respect to middle leg ML in which the lower Leg LL telescopes. An upper leg UL in which middle leg ML telescopes is typically fixedly secured to the trailer tongue and is fitted with a height adjustment mechanism HM (FIG. 2) for raising and lowering middle leg ML within upper leg UL.

Figure 2:
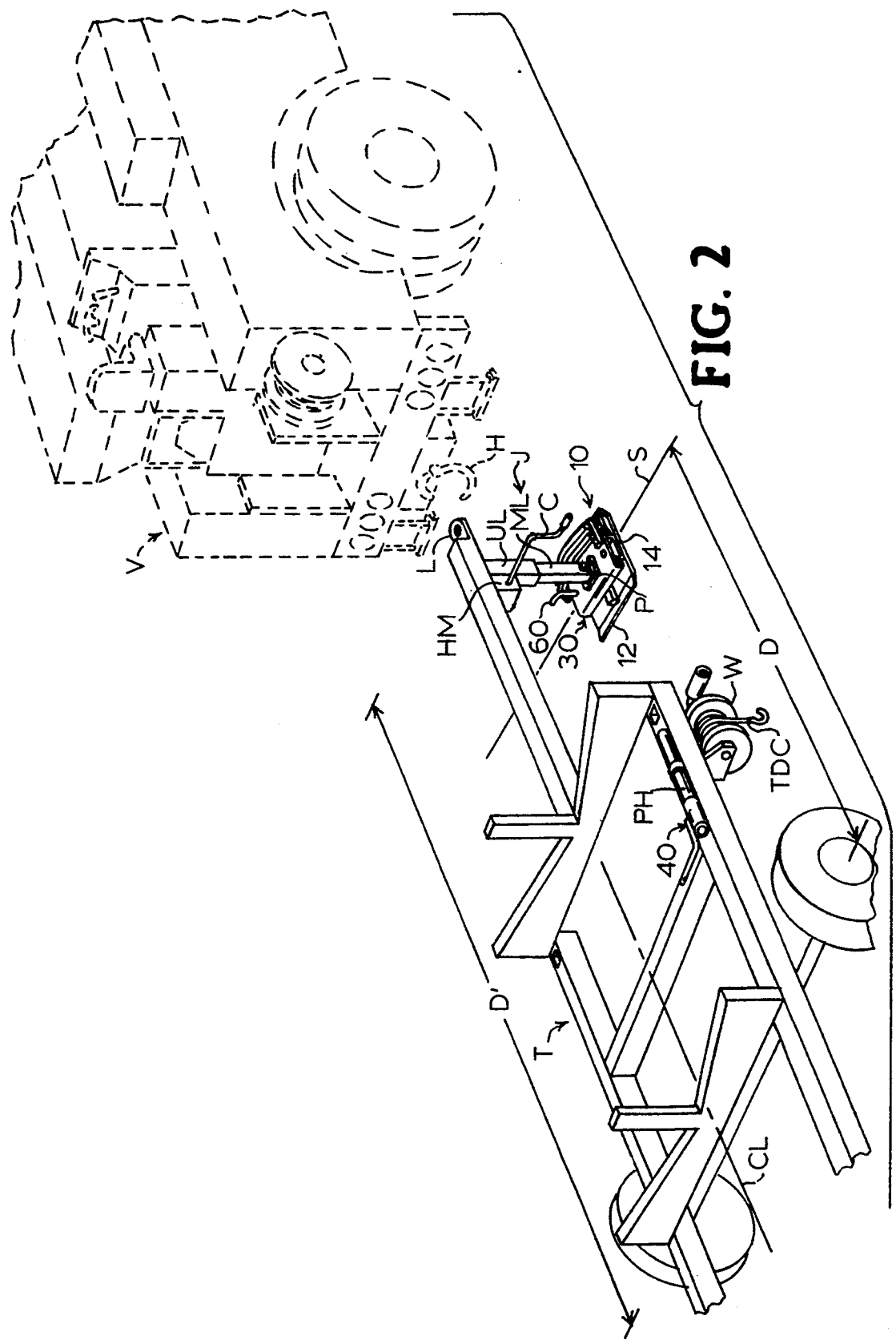
FIG. 2 is a perspective and somewhat simplified view of a heavy duty trailer used for hauling power poles, the poles being removed for purposes of illustration, and incorporating a first embodiment of the slidable support assembly of the invention assembled to the lower leg of a vertically extensible jack post with the locking pin but without the lever and showing a rear portion of a towing vehicle in dashed lines.

With continued reference to the drawings, slidable support assembly 10 of the invention is illustrated as installed on a single vertically adjustable jack leg J of a utility pole trailer T. As indicated in FIG. 2, jack leg J may be equipped with a conventional height adjustment apparatus HM operated by means of a crank C. Similar benefits are obtained in situations wherein a trailer has two jack legs J and utilizes a pair of slidable support assemblies 10, installed respectively on each such jack leg J. A hitch loop L is fixedly attached to the forward end of trailer T in a position to be engaged by hitch hook H of towing vehicle V (shown in dashed lines). The slidable support assembly 10 of the invention is equally useful with trailer hitching devices of the ball and socket type.

Figure 10:
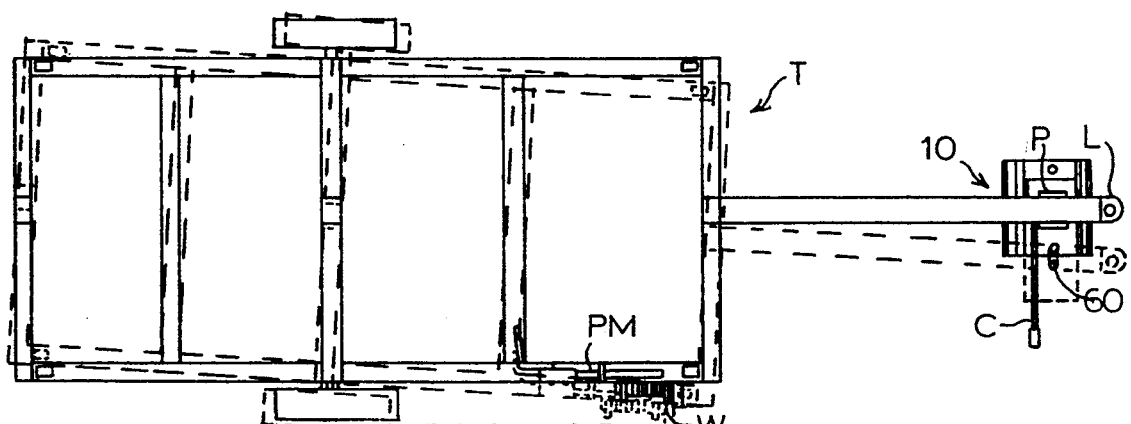
FIG. 10 is a plan view of a heavy duty trailer such as shown in FIG. 2 but without a load for purposes of illustration and indicating in dashed lines a shifted position such as can be obtained when the trailer is heavily loaded.

In the illustrated embodiment, the conventional jack post base plate BP (FIG. 1) is removed and the slidable support assembly 10 is fixedly and permanently attached to the foot or base portion of the lowermost leg LL of jack leg J, typically by welding, in an orientation so that the natural line of sliding S is substantially perpendicular to the center line CL of trailer T. The amount of movement of slidable support assembly 10 and hitch loop L is proportional to the ratio between the distance D from rear axle A and line of sliding S and the distance D' between rear axle A and hitch loop L. Dependent upon the position along the length of trailer T at which the slidable support assembly 10 is mounted, a lateral sliding movement of one inch of slidable support assembly 10 typically results in a movement of one and one half to two inches of hitch loop L as further illustrated in FIG. 10.

Figure 9B:
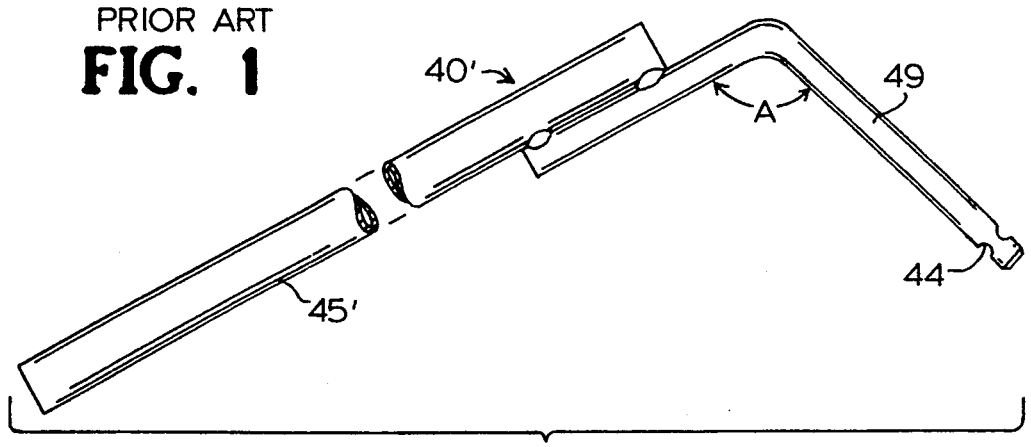
FIG. 9B is a side view of a second embodiment lever used to shift the slider member.
Figure 3:
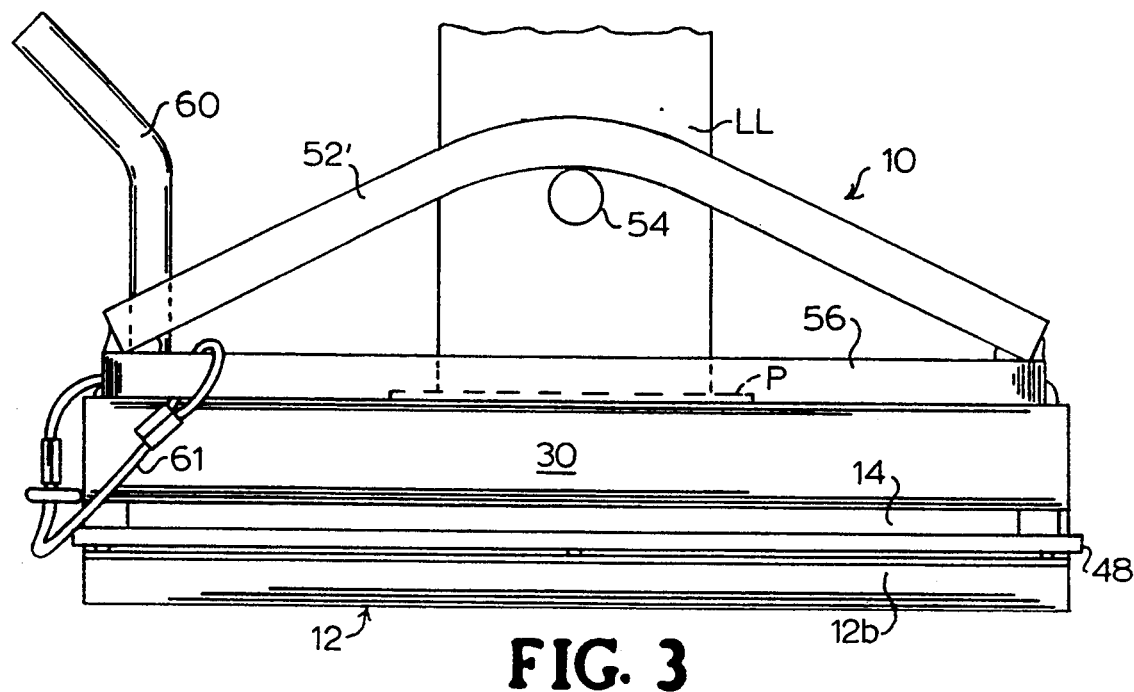
FIG. 3 is a front elevation view of the slidable support assembly of the invention in a central rest position and shown secured to the jack leg and with a locking pin in place.
Figure 9A:
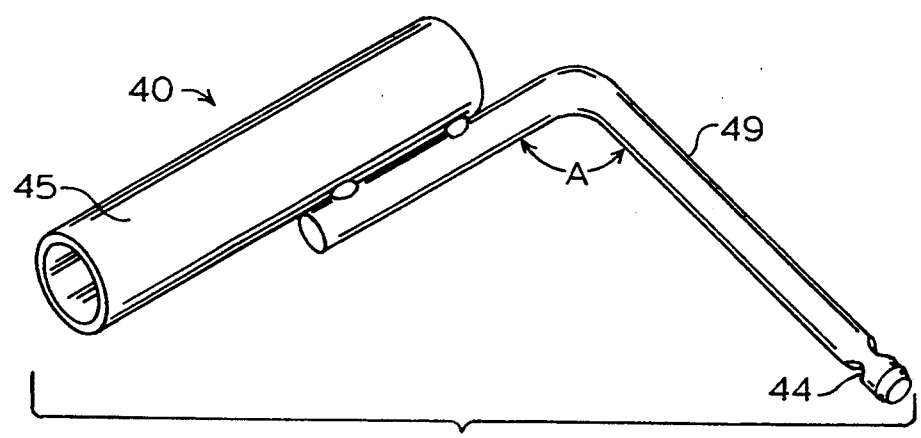
FIG. 9A is a side view of a first embodiment lever used to shift the slider member.

FIG. 3 portrays the slidable support assembly 10 in front elevation view as attached to the bottom of jack leg J with the operating lever 40 (FIG. 7 and 9A) or 40' (FIG. 9B) removed and the later explained locking pin 60 in use.

Figure 5:
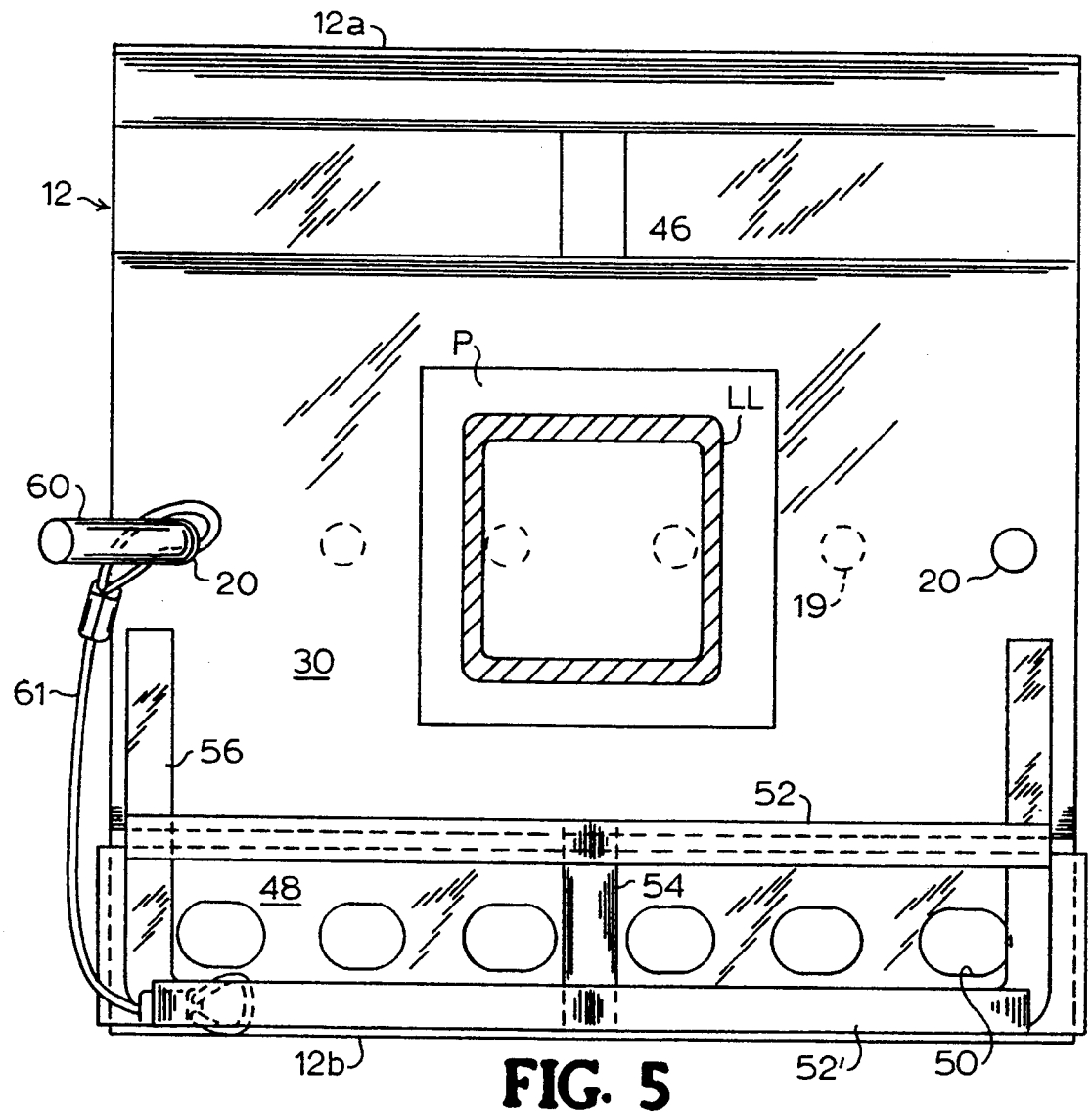
FIG. 5 is an enlarged top plan view of the slidable support assembly of FIG. 3 and illustrating the central location of the jack leg foot when welded, bolted or otherwise secured to the slider member and showing the locking pin in place.
Figure 6:
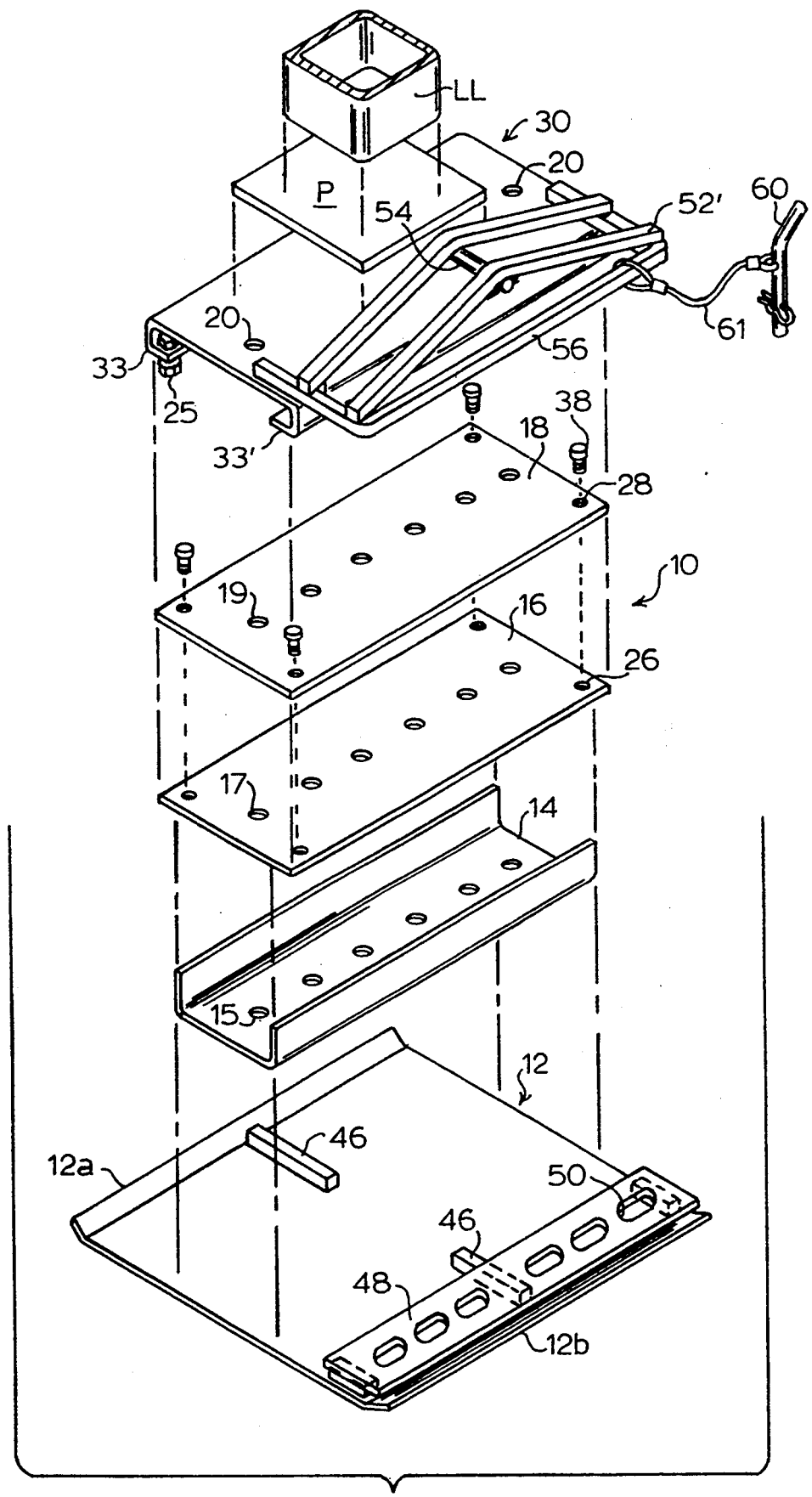
FIG. 6 is an exploded perspective view of the slidable support assembly of FIG. 3 with the associated locking pin but without the associated lever.
Figure 7:
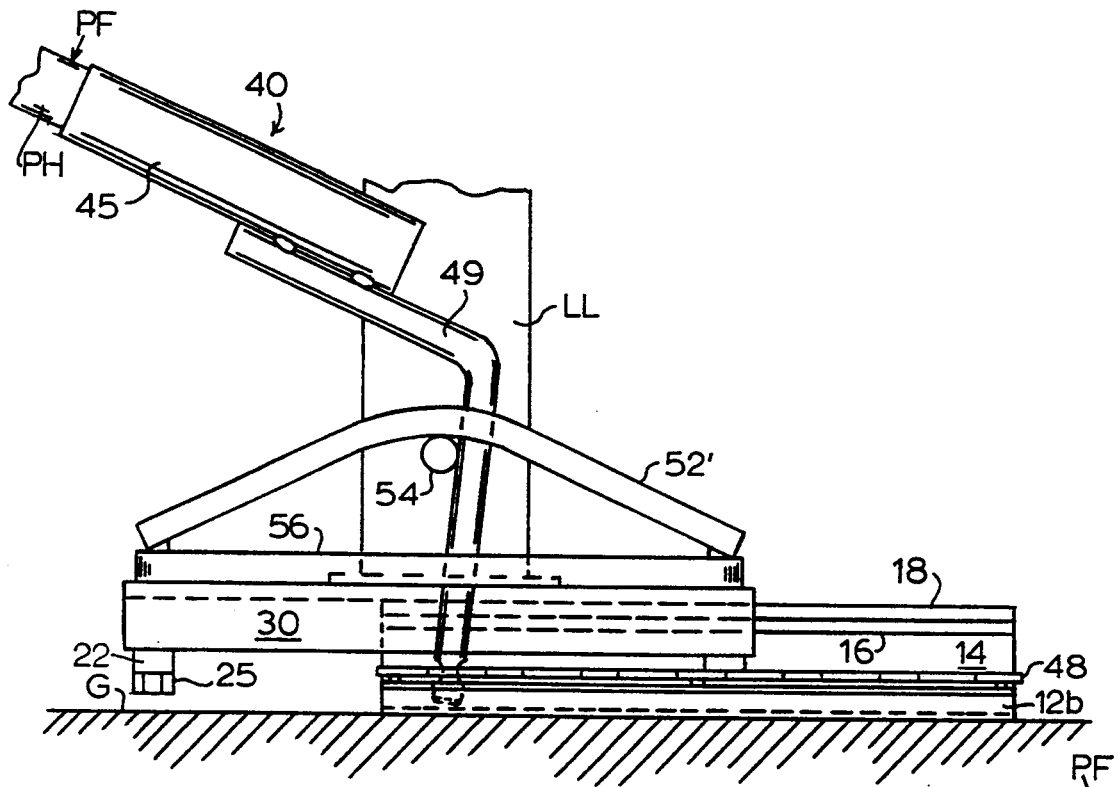
FIG. 7 is a side elevation view of the slidable support assembly of FIG. 3 after the slider member has been moved to the left from its central rest position by means of the lever and with the jack leg repositioned to the left.
Figure 8:
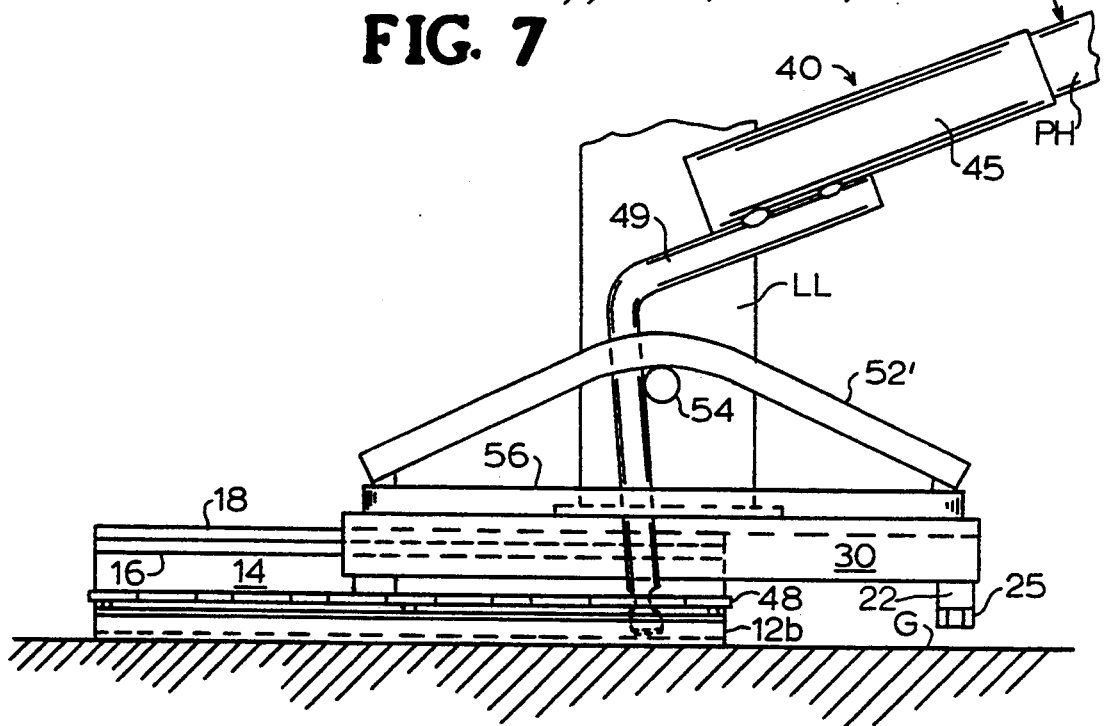
FIG. 8 is a side elevation view of the slidable support assembly of FIG. 3 after the slider member has been moved to the right from its central rest portion by means of the lever and with the jack leg repositioned to the right.

Fulcrum 54 is permanently fixed to a fulcrum frame 52, 52' and is located directly above a nest plate 48 having a plurality of "nests" or holes 50 passing therethrough as best seen in FIGS. 5 and 6. Fulcrum 54 is laterally offset from lower jack leg LL and is elevated above the slider 30 so as to provide optimum movement of the slider 30 with one stroke of the lever 40 or 40' as illustrated in FIGS. 7 and 8. The axis of the rod-like fulcrum 54 is generally parallel to the upper wall surface of slider 30 and is generally perpendicular to and intersects the vertical axis of leg LL. Levers 40 and 40' each have a double-sided engagement notch 44 at a first inner end, which is configured to interact with a selected nest 50 in which the respective lever 40 or 40' is inserted to prevent the lever from accidentally slipping out of engagement with the selected nest 50. Lever 40 has a pipe handle 45 portion at a second outer end and lever 40' has a solid rod like handle 45'. Levers 40 and 40', according to the preferred embodiment are each formed in their respective intermediate portions with an angle A between its notched end 44 and its handle end 45 or 45' and is each operated by a downward pressure PF on handle end 45 or 45' (FIGS. 7 and 8) which minimizes the possibility of injury to the back of the operator. The inner surface of the angled intermediate portion of each lever conveniently engages either side of the bearing surface provided by fulcrum 54.

In the typical heavy duty trailer T, there is provided a winch W operated by a pipe handle PH typically stored on the trailer as in FIG. 2 and having a tie down cable TDC used to anchor the poles to the trailer. Thus pipe handle 45 of lever 40 is sized to receive the pipe handle PH and use this for additional leverage as depicted in FIGS. 7 and 8. Also lever 40 can be stored with handle PH for transit as further shown in FIG. 2. For the types of trailers not having a readily available pipe handle for added leverage, the lever 40' is made of a tubular or solid rod construction of greater length than handle 45 of lever 40.

Figure 4:
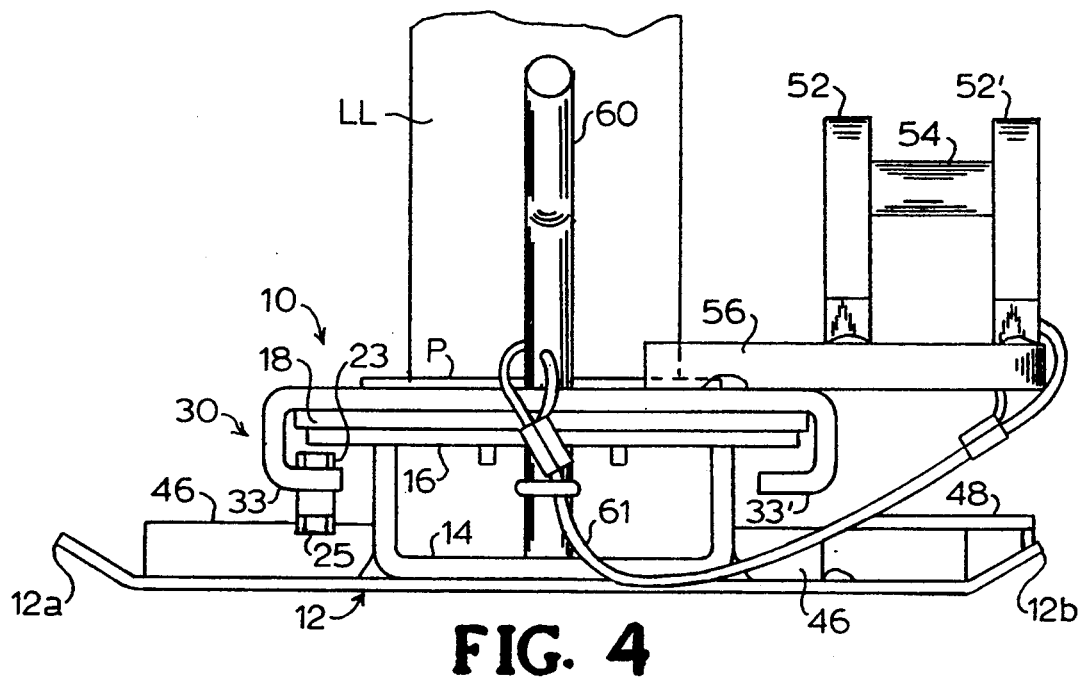
FIG. 4 is a side elevation view of the slidable support assembly.

FIGS. 3, 4 and 5, further depict the front, side and top views of the support assembly 10 of the invention, respectively. Details of individual parts of the support assembly 10 of the first embodiment are illustrated in exploded perspective view in FIG. 6. Base plate 12 is configured with upwardly angled front and rear edges 12a, 12b respectively in similar fashion to the configuration of base BP of the conventional jack leg (FIG. 1). This enables the base plate 12 to slide across the ground and thus reduce possible damage in case towing vehicle V (FIG. 1) tends to pull or push trailer T when coupling or decoupling.

A channel shaped metal formed spacer 14 is assembled substantially in the center of base plate 12 in an orientation intermediate to the upwardly angled edges 12a and 12b thereof. A pair of support blocks 46 are attached to base plate 12 and extend inwardly from each lateral edge of base plate 12. Spacer 14 is designed to nest between the spacer blocks 46 as best illustrated in FIG. 6 and formed oval or elliptical in shape provide bearing surfaces and are formed along a line through plate 48 and are of sufficient width to receive the notched lower end 44 of lever 40 or 40' and of sufficient length to allow lever 40 or 40' to be moved through an angle sufficient to slide slider 30 to either an extreme right or left position.

To operate the slidable support assembly 10 of the invention, an operator places lever 40 or 40' against one side or the other of the fulcrum 54 bearing surface and inserts the notched end 44 into a selected nest 50. The operator applies the force PF to the respective handle 45 or 45' so as to effectively cause the upper portions of slidable support assembly 10 to slide or shift relative to the lower portions thereof as best illustrated in FIGS. 7 and 8.

A substantially planar top plate 16 is permanently fixed in symmetrical position to the top support surface of spacer 14 and is formed with a number of holes 28 adapted to receive fasteners 38 for securing a low-friction bearing plate 18 thereupon. Fasteners 38 may be screws, rivets, or other type fastener means so that any upwardly positioned head portion thereof is recessed below the upper surface of bearing plate 18 and which may be made of any appropriate low-friction material such as for example material sold under the trademarks TEFLON ™ or DELRIN ™.

Slider 30 is formed as a short channel having its upper surface or wall (FIG. 5) of a width and length to linearly slidingly engage bearing plate 18, and its lower, inwardly facing flanges 33, 33' positioned to loosely surround bearing plate 18 and top plate 16 when secured thereon and thereby limit widthwise movement. The upper surface of slider 30 mounts a welded on plate P which is fixedly secured to the lowermost leg LL of jack leg J (FIG. 6) so as to cause jack leg J to move laterally when slider 30 is caused to move laterally, and thus align hitch loop L of trailer T with hitch hook H of towing vehicle V. By this interconnected structural arrangement, when jack leg J is raised, the entire slidable support assembly 10 raises also and cannot therefore be easily transported.

It is understood that ball bearings, wheels and other low-friction devices known in the art may be used in place of the low-friction bearing plate 18 on which slider 30 slides back and forth.

It is also recognized that slider 30 and jack leg J should preferably be supported over the central area of the lower components of the slidable support assembly 10 to properly balance trailer T. Therefore the maximum lengthwise or longitudinal distance slider 30 moves is controlled so that the center of the weight of jack leg J is never beyond either lateral edge of base 12. For this function, bars 46 (FIG. 6) are secured approximately midway of the length of base 12 and are adapted in one embodiment to be alternately engaged by a pair of downwardly extending stop elements 22 at opposite ends on one side of slider 30, one stop element 22 being shown in FIG. 7 and the other in FIG. 8. The pair of elements 22 secured to the slider 30 effectively straddle one of the bars 46.

In the embodiment depicted in FIGS. 7 and 8 the downwardly extending elements 22 each comprise a screw 23 penetrating through the slider flange 33, fastened by a nut 25 and are each of a length sufficient to engage the respective bar 46 and prevent further lengthwise movement of slider 30.

The slidable support assembly 10 of the invention further provides means to releasably lock the slider 30 relative to the low-friction bearing plate 18 to prevent unwanted movement of slider 30 and forward end of trailer T once the operator has properly aligned trailer hitch loop L to towing vehicle hitch hook H. The low-friction bearing plate 18, top plate 16, and spacer 14, have a plurality of aligned apertures 19, 17, 15 penetrating vertically therethrough, along a line oriented substantially parallel to the side edges of the slider 30. Slider 30 has at least one upper aperture 20 overlying the line along which lower apertures 19, 17, 15 are formed. A releasable lock pin 60 is received by the upper aperture 20 and a selected one of the lower apertures 19, 17, or 15 to releasably lock the slider 30.

Figure 11:
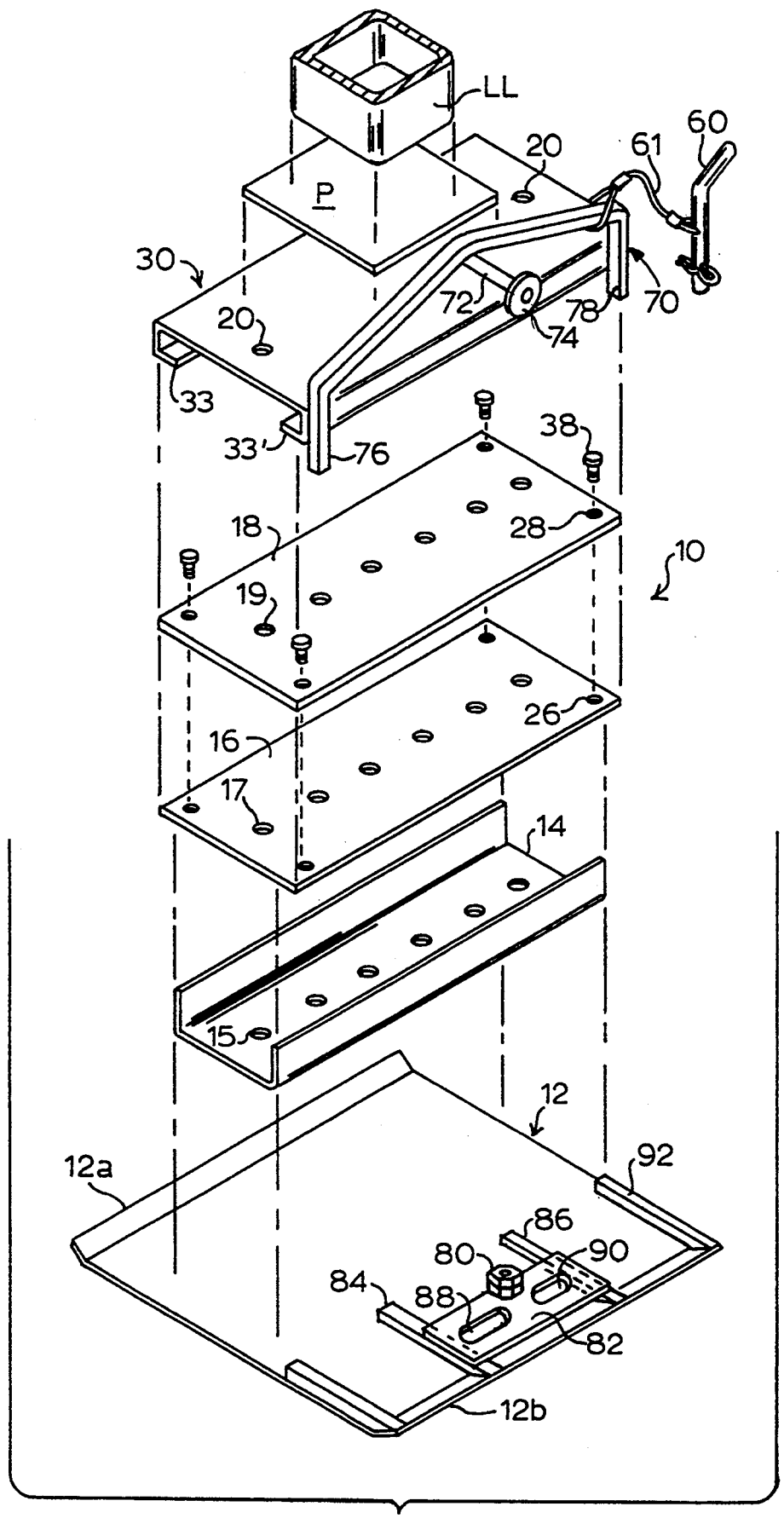
FIG. 11 is an exploded perspective view of a slidable support assembly according to a second embodiment of the invention.
Figure 12:
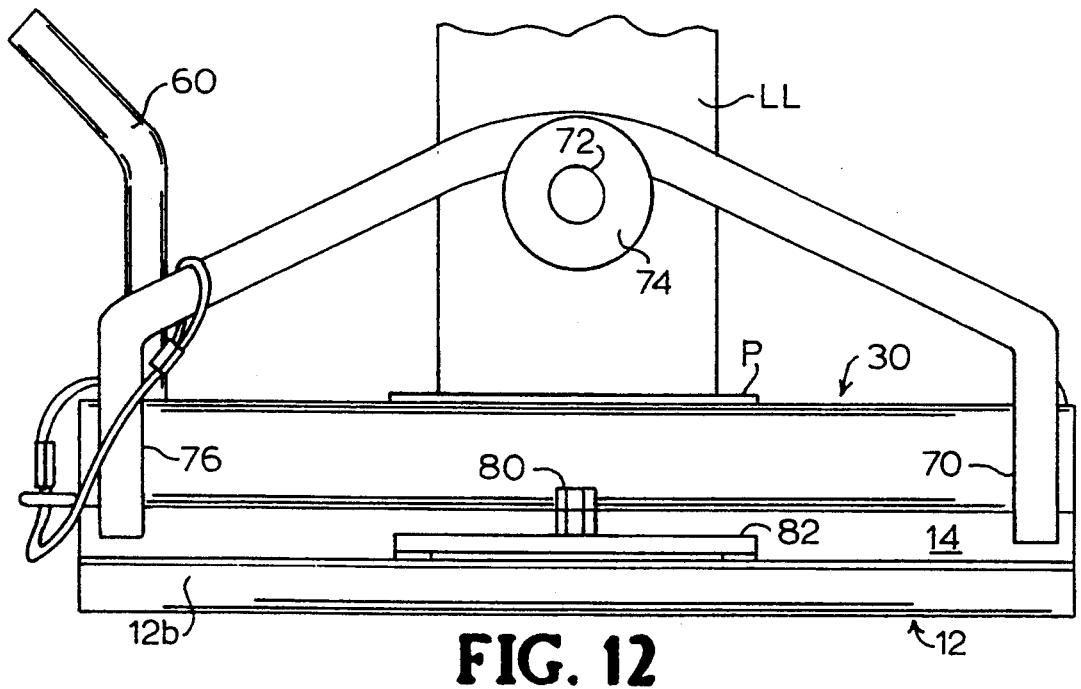
FIG. 12 is a front elevation view, similar to that of FIG. 3, of the slidable support assembly of FIG. 11 with the locking pin in place but without the lever.

In the second embodiment support assembly 10' illustrated in FIGS. 11 and 12, many parts similar to those of the first embodiment are employed and for such parts the same numerals are used. The primary difference between the first and second embodiments resides in the fulcrum, lever engaging and stop arrangements. Making reference to FIGS. 11 and 12, the generally inverted U-shaped bar 70 mounts an outwardly extending fulcrum arm 72 having an end stop 74 and downwardly extending legs 76, 78 which during travel back and forth engage a single vertical stop member 80. Plate 82 mounted on bars 84, 86 has two apertures 88, 90 for receiving the respective notched ends 44 of the respective levers 40 or 40'. A U-shaped strengthening bar 92 completes the construction. In operation, the intermediate portion of the lever 40 or 40' pivots against the fulcrum bar 72 and the notched end 44 of the lever bar is placed in a selected hole 88 or 90 and pressure is applied to shift the slider 30 in the desired direction as previously described.

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A sliding jack post support assembly for use with a typically heavily loaded trailer having a forward tow structure and a metal formed trailer jack on the tow structure fitted with a vertically adjustable jack post having a lower leg, said assembly being adapted when supporting the jack post lower leg to adjust the trailer tow structure with respect to a towing vehicle to be hitched thereto, said sliding jack post support assembly comprising:
   (a) a metal formed base support having a ground engaging support portion and a first elevated flat horizontal substantially rectangular wall;
   (b) a metal formed upper support having a second elevated flat horizontal substantially rectangular wall positioned for being supported by and for moving longitudinally of said first wall in a plane parallel thereto, said second wall being fixedly secured in a central upper surface portion thereof to the lower end of the lower leg forming part of the jack post being supported by said assembly;
   (c) first means for limiting widthwise movement of said second wall on said first wall;
   (d) second means for limiting longitudinal movement of said second wall on said first wall;
   (e) third means interposed between said first and second walls providing a low friction support for said second wall on said first wall;
   (f) said base support, upper support, first, second and third means and jack post lower leg being assembled in a manner which enables the entire said assembly to be raised and lowered as a unitary structure in correspondence with raising and lowering of said jack post lower leg at times when the trailer tow structure is being supported by a towing vehicle and to travel affixed to the tow structure when said trailer is in transit;
   (g) a metal formed fulcrum structure laterally offset and spaced outwardly from said jack post lower leg and mounted on, along one side of and extending above said upper support and mounting a fulcrum member located above, extending outwardly of and residing generally parallel to the plane of said second wall and providing a fulcrum bearing surface against which an intermediate portion of a lever can be rocked;
   (h) the lever having a handle end, and a base end adapted for engaging a selected base support bearing surface formed on said base support and residing below said fulcrum; and
   (i) base support stop moans providing a series of longitudinally aligned rigidly located stop holes located directly below said fulcrum structure each providing the base support bearing surface against which said lever base end can be pressed enabling said intermediate portion of said lever by lever action against said fulcrum bearing surface to force longitudinal movement of said upper support on said base support and corresponding longitudinal movement of said jack post lower leg when bearing the load of said trailer tow structure.

2. A sliding jack support assembly as claimed in claim 1 wherein said tow structure is of a type which mounts a winch with a pipe handle stored on said trailer and said lever handle end is formed to receive said winch handle for establishing additional leverage.

3. A sliding jack support assembly as claimed in claim 1 wherein said fulcrum member comprises a tubular member with the axis of said tubular member positioned so as to reside generally perpendicular to and to intersect the vertical axis of said jack post lower leg.

4. A sliding jack support assembly as claimed in claim 1 wherein said stop means comprises a metal nest plate secured to said base support having a said plurality of longitudinally aligned holes.

5. A sliding jack support assembly as claimed in claim 1 wherein said second means for limiting longitudinal movement of said second wall on said first wall comprises cooperative stop members located on said base support and upper support and operative to engage when said upper support is attempted to be moved longitudinally in either direction beyond a predetermined limit.

6. A sliding jack support assembly as claimed in claim 1 wherein said second means for limiting longitudinal movement of said second wall on said first wall comprises a pair of stop members located along one side and at outer end extremities of said upper support and a single stop member fixed to said base support in the path of travel of said pair of stop members.

7. A sliding jack support assembly as claimed in claim 1 wherein said lever is angled between said handle and base end.

8. A sliding jack post support assembly for use with a typically heavily loaded trailer having a forward tow structure and a metal formed trailer jack on the tow structure fitted with a vertically adjustable jack post having a lower leg, said assembly being adapted when supporting the jack post lower leg to adjust the trailer tow structure with respect to a towing vehicle to be hitched thereto, said sliding jack post support assembly comprising:
   (a) a metal formed base support having a ground engaging support portion and a first elevated flat horizontal substantially rectangular wall;
   (b) a metal formed upper support having a second elevated flat horizontal substantially rectangular wall positioned for being supported by and for moving longitudinally of said first wall in a plane parallel thereto, said second wall being fixedly secured in a central upper surface portion thereof to the lower end of the lower leg forming part of the jack post being supported by said assembly;
   (c) first means for limiting widthwise movement of said second wall on said first wall;
   (d) second means for limiting longitudinal movement of said second wall on said first wall;

(e) third means interposed between said first and second walls providing a low friction support for said second wall on said first wall;

(f) said base support, upper support, first, second and third means and jack post lower leg being assembled in a manner which enables the entire said assembly to be raised and lowered as a unitary structure in correspondence with raising and lowering of said jack post lower leg at times when the trailer tow structure is being supported by a towing vehicle and to travel affixed to the tow structure when said trailer is in transit;

(g) a metal formed fulcrum structure laterally offset from said jack post lower leg mounted on and extending above said upper support and having a fulcrum member providing a lever bearing surface elevated above the level of said second wall;

(h) a lever having a handle end, an intermediate portion for engaging said lever bearing surface and a base end adapted for engaging a selected bearing surface formed on said base support and residing below said fulcrum; and (i) rigid stop means fixed to said base support with holes forming plural bearing surfaces for said lever base end and located directly below said fulcrum structure enabling said intermediate portion of said lever by lever action against said lever bearing surface and said lever base end by lever action against a selected one of said plural bearing surfaces to force longitudinal movement of said upper support on said base support and corresponding longitudinal movement of said jack post lower leg when bearing the load of said trailer tow structure.

9. A sliding jack support assembly as claimed in claim 8 wherein said second means for limiting longitudinal movement of said second wall on said first wall comprises a pair of stop members located along one side and at outer end extremities of said upper support and a single stop member fixed to said base support in the path of travel of said pair of stop members.

10. A sliding jack post support assembly for use with a typically heavily loaded trailer having a forward tow structure and a metal formed trailer jack on the tow structure fitted with a vertically adjustable jack post having a lower leg, said assembly being adapted when supporting the jack post lower leg to adjust the trailer tow structure with respect to a towing vehicle to be hitched thereto, said sliding jack post support assembly comprising:

(a) a metal formed base support having a ground engaging support portion and a first elevated flat horizontal substantially rectangular wall;

(b) a metal formed upper support having a second elevated flat horizontal substantially rectangular wall positioned for being supported by and for moving longitudinally of said first wall in a plane parallel thereto, said second wall being adapted to support in a central upper surface portion thereof the lower end of the lower leg forming part of the jack post being supported by said assembly;

(c) first means for limiting widthwise movement of said second wall on said first wall;

(d) second means for limiting longitudinal movement of said second wall on said first wall;

(e) third means interposed between said first and second walls providing a low friction support for said second wall on said first wall;

(f) said base support, upper support, first, second and third means and jack post lower leg being assembled in a manner which whenever said jack post lower leg is fixedly secured to said upper support central upper surface portion enables the entire said assembly to be raised and lowered as a unitary structure in correspondence with raising and lowering of said jack post lower leg at times when the trailer tow structure is being supported by a towing vehicle and to travel affixed to the tow structure when said trailer is in transit;

(g) a metal formed fulcrum structure laterally offset from a location of said jack post lower leg being mounted on and above said upper support and having a fulcrum member providing a lever bearing surface elevated above the level of said second wall;

(h) a lever having a handle end, an intermediate portion for engaging said lever bearing surface and a base end adapted for engaging a selected bearing surface formed on said base support and residing below said fulcrum; and (i) rigid stop means fixed to said base support with holes forming plural bearing surfaces for said lever base end and located directly below said fulcrum structure enabling said intermediate portion of said lever by lever action against said fulcrum bearing surface and said lever base end by lever action against a selected one of said plural bearing surfaces to force longitudinal movement of said upper support on said base support and corresponding longitudinal movement of said jack post lower leg when bearing the load of said trailer tow structure.

* * * * *